United States Patent [19]
Macovski

[11] 3,840,747
[45] Oct. 8, 1974

[54] GAMMA RAY IMAGING SYSTEM

[76] Inventor: Albert Macovski, 4100 Mackay Dr., Palo Alto, Calif. 94306

[22] Filed: Apr. 9, 1973

[21] Appl. No.: 349,268

[52] U.S. Cl.................. 250/369, 250/505, 250/514
[51] Int. Cl............................................. G01t 1/20
[58] Field of Search ........... 250/363, 366, 369, 503, 250/505, 514

[56] References Cited
UNITED STATES PATENTS

| | | | |
|---|---|---|---|
| 2,747,797 | 5/1956 | Beaumont...................... | 250/514 X |
| 3,489,897 | 1/1970 | Wainer............................. | 250/505 |
| 3,585,387 | 6/1971 | Bramlet.......................... | 250/505 X |
| 3,752,981 | 8/1973 | Jaszczak........................ | 250/369 X |

*Primary Examiner*—Archie R. Borchelt

[57] ABSTRACT

A multi-aperture plate is placed between a radioactive source and a gamma ray camera. This creates a sum of images, each seen through a different aperture position. Each aperture image is cyclically modulated with a moving shutter. On reconstruction the individual images are demodulated by using their carrier signals. The individual images are translated and combined to view any section of the radioactive source.

18 Claims, 3 Drawing Figures

3,840,747

GAMMA RAY IMAGING SYSTEM

BACKGROUND OF THE INVENTION

1. Field of the Invention

This invention relates to gamma ray imaging systems. In a primary application the invention relates to the imaging of a three-dimensional distribution of a radioactive emitter where any plane of the distribution can be selectively observed. The specific tomographic plane to be observed can be selected after the imaging process.

2. Description of Prior Art

At present gamma ray cameras are used to image the selective takeup of radioactive materials which are administered into the body. This general field of nuclear medicine is based on the fact that specific chemicals are selectively deposited in specific organs or pathological regions having various types of disease. In the earlier work in the field the imaging was accomplished solely by gamma ray detectors which were mechanically scanned over the body to measure the local radioactivity. This technique is described by W. V. Mayneord et al., "Method of Making Visible the Distribution of Activity in a Source of Ionizing Radiation," Nature, Vol. 168, pp. 762, 1951. Since these scanning techniques only look at one region at a time, the patient is receiving a relatively high dose of radiation from the radioactive material since the entire area of interest is receiving radiation simultaneously. The gamma cameras overcome this problem by observing the entire area of interest simultaneously. The lateral coordinates of each received photon is calculated, with the sum forming a two-dimensional image. One example of a gamma camera is the Anger camera named after its inventor H. O. Anger. It employs an array of photomultipliers facing a scintillating crystal detector. The distribution of light amongst the photomultipliers determines the position of each event. This camera is currently widely used in nuclear medicine and is manufactured by Nuclear Chicago Corporation and others. Other cameras work on a similar principles such as the Baird-Atomic System 70 which contains a 14 × 21 array of scintillating crystals with the row and column information complied to 35 photo-multipliers. Recent work on a higher resolution camera was described by L. Kaufman et. al., "Wire Spark Chambers for Clinical Imaging of Gamma Rays," Physics in Medicine and Biology, Vol. 18, No. 3, p. 417, 1971.

In any of the aforementioned cameras an imaging technique is required to image the radioactive region onto the sensitive area of the camera. Unlike optics, no lens structure exists which can focus high energy gamma rays. Thus geometrical shadowing is the only available technique. Two general types of imaging structures are used; the pin-hole and the parallel hole collinator. They each create the images by accepting only a small portion of the emitted gamma rays at a narrow range of angles. Their overall transmission efficiency is of the order of $10^{-4}$. This poor efficiency necessitates higher radiation to the patient since it determines the dosage of the radioactive material. Even at this efficiency, however, the lateral resolution is about 1cm which makes the visualization of many lesions extremely difficult or impossible. The image contains no three-dimensional or depth information since the radiation from different depths becomes superimposed. By rotating a slanted collimator one pre-selected depth place can be isolated. This technique is described by H. O. Anger, "Transverse-section Tomography with the Scintillation Camera," Journal of Nuclear Medicine, Vol. 8, pp. 314–315, 1967. The desired plane cannot be selected after the examination, so that a separate examination is required for each depth plane, thus increasing the radiation dose.

SUMMARY OF INVENTION

An object of this invention is to provide apparatus for imaging gamma rays onto a detector in a temporally encoded form.

It is also an object of this invention to provide a method of decoding the detector signals so that any cross section of the gamma ray source can be reconstructed.

Briefly, in accordance with this invention, a multi-aperture plate is placed between the gamma ray source and the gamma ray detector. The rays through each aperture are amplitude modulated at a constant frequency by a moving shutter. The detector output thus contains a sum of images as seen from different angles each modulated at a different frequency. These are individually synchronously detected and translated laterally so that their sum will represent a specific plane in the gamma ray source.

BRIEF DESCRIPTION OF THE DRAWING

For a more complete disclosure of the invention, reference may be made to the following detailed description of several illustrative embodiments thereof which is given in conjunction with the accompanying drawings, of which.

DESCRIPTION OF THE PREFERRED EMBODIMENT

Figure 1:
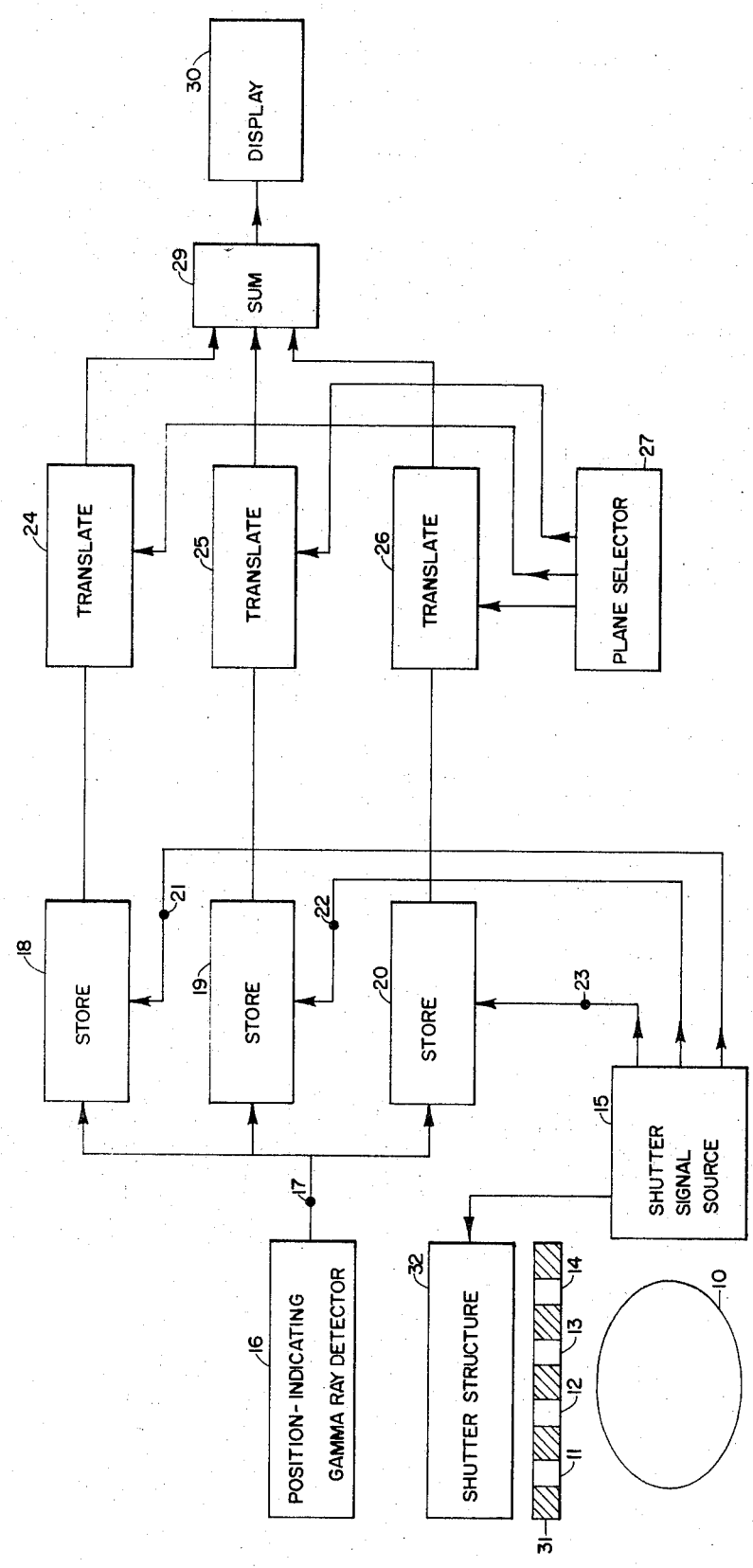
FIG. 1 is a block diagram of the gamma camera and the reconstruction system.

An understanding of the broad aspects of the invention may best be had by reference to FIG. 1 of the drawings. The radioactive source 10 is normally the administered radioactive isotope in the body. In addition, however, it can represent the scattered radiation from a region being excited by a high energy source. The gamma rays from this source are collected through a number of apertures. For simplicity four such apertures are shown, 11, 12, 13, and 14, each situated in aperture plate 31. To separately identify the information in each aperture a shutter structure 32 is used which interrupts the gamma rays in each hole at a unique frequency or phase. The temporally coded gamma rays are then detected by gamma ray detector 16.

The gamma ray detector can be any of the known devices which compute the lateral $x$ and $y$ coordinates of an incoming gamma ray. These include the Anger camera and wire chambers which were previously referred to. They each provide an output 17 which indicates the $x$ and $y$ position of each recorded event. A shutter signal source 15 includes an array of square wave signals which indicate the open and closed time of each of the apertures. Each of these signals is used to control a two-dimensional storage device, one for each aperture.

Three of these storage devices are shown, 18, 19, and 20. These can be digital storage devices. If an event in the gamma ray detector 17 occurs during the open time of a particular aperture, a count is added at the recorded $x, y$ position to the storage device corresponding to that aperture. If the event is received when the aperture is closed, a count is subtracted from the storage device at that $x, y$ position.

As a specific example, assume that storage device 18 is storing the image seen by aperture 11. Signal 21 is a square wave signal which goes positive when the shutter on aperture 11 is open and goes negative when the shutter is closed. When signal 21 is positive, all counts received from signal 17 will be added into their particular $x, y$ locations in storage device 18. These counts will be both the desired information from aperture 11, and some undesired information from apertures which are also open during part of the time that signal 21 is positive. During the negative going part of signal 21 all of the received counts are coming from other apertures and are therefore subtracted from their particular $x, y$ locations in storage device 18. If the various shutter signals 21, 22, and 23 are orthogonal, over a long term average, any counts coming through the apertures other than 11 will average to zero since they will be subtracted as often as they are added. Thus the storage device 18 will contain the isolated image as seen from aperture 11.

For a mathematical analysis of this operation, assume $I_n$ is the gamma ray image as seen by the $n^{th}$ aperture. Let $g_n(t)$ be a square wave signal at frequency $f_n$ which is alternating between plus one and minus one. Thus the signal due to the $n^{th}$ aperture is $I_n 1/2[1+g_n(t)]$ which represents the signal $I_n$ being turned on and off at a frequency $f_n$. The sum of all of these signals appears at 17. At each storage device this sum signal is multiplied by the appropriate $g_m(t)$ and integrated over time $T$, the time during which counts are received. The resultant stored signal is given by $$I_m = \int_0^T \left[ \sum_{n=0}^{N} I_n 1/2 (1+g_n(t)) \right] g_m(t)\, dt$$

where the summation symbol indicates a sum over the total of $N$ apertures. This expression can be expanded into a number of integrals each having the form $$\int_0^T g_n(t) g_m(t)\, dt.$$

This integral has the value $T$ where $n=m$ corresponding to two square waves having the same frequency and phase. This represents the desired output signal coming from the aperture of interest. Where $n \ne m$ it would be desirable for the integrated output to be zero or negligible compared to $T$. The output will be negligible compared to T if the integration time $T$ contains a large number of cycles at the difference frequency $f_n - f_m$. Stated mathematically $|f_n - f_m| T \gg 1$. The output will be zero for the undesired signals, $n \ne m$, if the integration time $T$ is equal to an integral number of periods for every frequency used, so that $Tf_n$ is an integer for every $f_n$. Thus far, in the examples given, the various apertures were shuttered at different frequencies. An orthogonal relationship can also be realized by two square waves of the same frequency which are 90°, or a quarter period, out of phase. The criterion to make the output negligible is $2 f_n T \gg 1$, that is the integration period $T$ includes a large number of cycles at twice the square wave frequency. For zero output the criterion is the same as above, $Tf_n$ is an integer. Thus a convenient arrangement is the use of an even number $N$ of apertures using $N/2$ different frequencies where each frequency is used for two apertures with the quadrature phase relationship.

In the previous analysis it was assumed that each $I_n$ was a continuous signal. Actually, since each signal is made up of a number of discrete events, the cancellation of the undesired signal where $n \ne m$ is a statistical procedure and is not exact. The resultant undesired signals at each storage location will be dependent on the total number of counts used.

Thus, within the approximations discussed, each storage device 18, 19, and 20 contains a two dimensional projection of the source 10 as seen by the various apertures. Assume that the source 10 has a three dimensional intensity as given by $I(x,y,z)$. The two dimensional image $I_n(x,y)$ due to the information from plane $z$ passing through aperture $n$ is given by $$I_n(x,y) = I[l/l-z(x-x_n\, z/z-l,\, y - y_n\, z/z-l),\, z]$$

where $l$ is the distance from the aperture plate to the gamma ray detector, $z$ is the distance from the plane of interest in the source to the gamma ray detector, and $x_n$ and $y_n$ are the coordinates of the $n^{th}$ aperture. Thus the radiation from plane $z$ in the source 10 is magnified by $l/l-z$ and displaced in $x$ and $y$ by $x_n z/z-l$ and $y_n z/z - l$. If these offsets are removed, that is if the image $I_n(x,y)$ is displaced by $-x_n z/z-l$ and $-y_n z/z-l$, then the image from plane $z$ will be re-centered. If this is done for all stored images $I_n$, and the results are added, the images from plane $z$ will all add coherently while the images from other planes will not add and thus be out of focus.

As a specific example, assume storage devices 18, 19, and 20 are digital storage devices. If it is desired to observe plane $z$, the values $-x_n z/z - l$ and $-y_n z/z - l$ are inserted by plane selector 27 into translators 24, 25, and 26. The plane selector 27 is calibrated to provide the correct lateral offset for each stored image for any desired depth plane. The translators add the appropriate shift in $x$ and $y$ coordinates to the stored image when it is transferred to the summing device 29. This device is also an image storage system such as a digital store. When the appropriately translated images are added and stored in 29 they represent an image which is focused in the desired plane. This stored image can then be read out into display 30. Plane Selector 27 can be continuously varied so that display 30 will provide a sequence of images representing a continuously varying depth plane of source 20. If desired, each plane can be displayed in its proper relative size by scaling the output dimensions by $l - z/l$, the reciprocal of the magnification. This can be accomplished by changing the deflection of the display device 30 for each selected plane.

The system shown in FIG. 1 required a separate storage device for each aperture. A somewhat simpler but less flexible system can be used. Instead of being coupled to an array of relatively expensive storage devices, the signal 17 can be coupled directly to the translators 24, 25 and 26. The square wave signals 21, 22, and 23, indicating the shuttering of the apertures, can now be coupled directly to the translators 24, 25, and 26. The plane selector 27 is set as before to a specific plane and thus provides the desired lateral translation information. When signal 17 provides a count at a specific $x$, $y$ location to all of the translators, each translator makes two determinations on that count. Firstly, the square wave shutter signal sources 23, 24, and 25 determine whether it is to be added or subtracted and secondly, the plane selector signals determine its lateral translation. Each count, with the appropriate polarity and translation from each translator, is applied to the sum storage device 29. The resultant summation image in 29 is exactly the same as that obtained previously. However, only the single plane can be selected since the information of signal 17 is not available to study other planes. To overcome this problem a storage system, such as magnetic tape, can be added to store both signal 17 and the associated shutter signals 21, 22, and 23. This tape can be replayed each time a new plane is studied. As before the translators, with a new lateral translation, will add or subtract the stored counts in the summer 29 to provide the desired plane.

Figure 2:
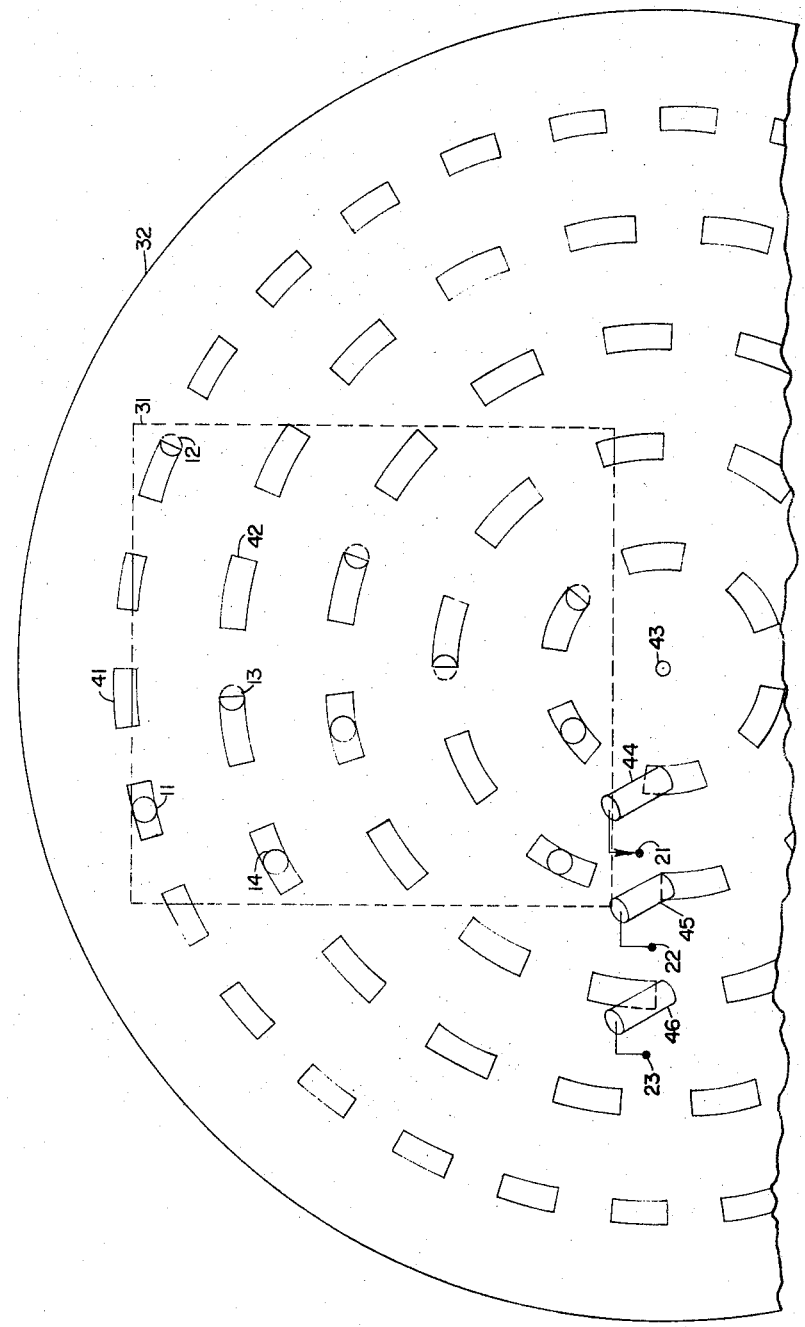
FIG. 2 is a front view of an embodiment of the shutter structure and multiaperture plate.

FIG. 2 shows one embodiment of the shutter structure 32 modulating the aperture plate 31. These are made of materials relatively opaque to gamma rays such as lead. The shutter structure 32 is a disc containing an array of slots 41 and 42 situated in concentric circles. These slots periodically allow and stop transmission through apertures 11, 12, 13 and 14 as the disc rotates about axis 43. In the embodiment shown, two apertures are used at each frequency as was previously noted. These are placed so as to be 90° out of phase with each other so that while one aperture is in the center of an opening, the other is 50 percent obscured. As can be seen, a variety of aperture numbers and positions can be used with this arrangement. Each sequence of slots generates a different frequency. If an integral number of slots are arranged at each circumference, and the shutter structure 32 is rotated an integral number of times, then the previous relationship will be met whereby an integral number of cycles is used at each frequency. As was previously pointed out, this insures that there will be no average contribution from one aperture signal into another. A variety of well known methods can be used to derive the appropriate square wave shutter signals. In the embodiment shown an array of photocells, 44, 45, and 46 are positioned adjacent the slots in a region outside of the aperture plate 31. A source of illumination, not shown, is used on the opposite side of the shutter structure. The slots interrupt the light and generate the appropriate signals 21, 22, and 23. To obtain quadrature signals from the single frequency at each circle, either an additional photocell appropriately positioned can be used, or a delay can be introduced in the electrical signals to form the quadrature relationship. This shutter structure has the disadvantage that its overall size is considerablly larger than the aperture plate.

Figure 3:
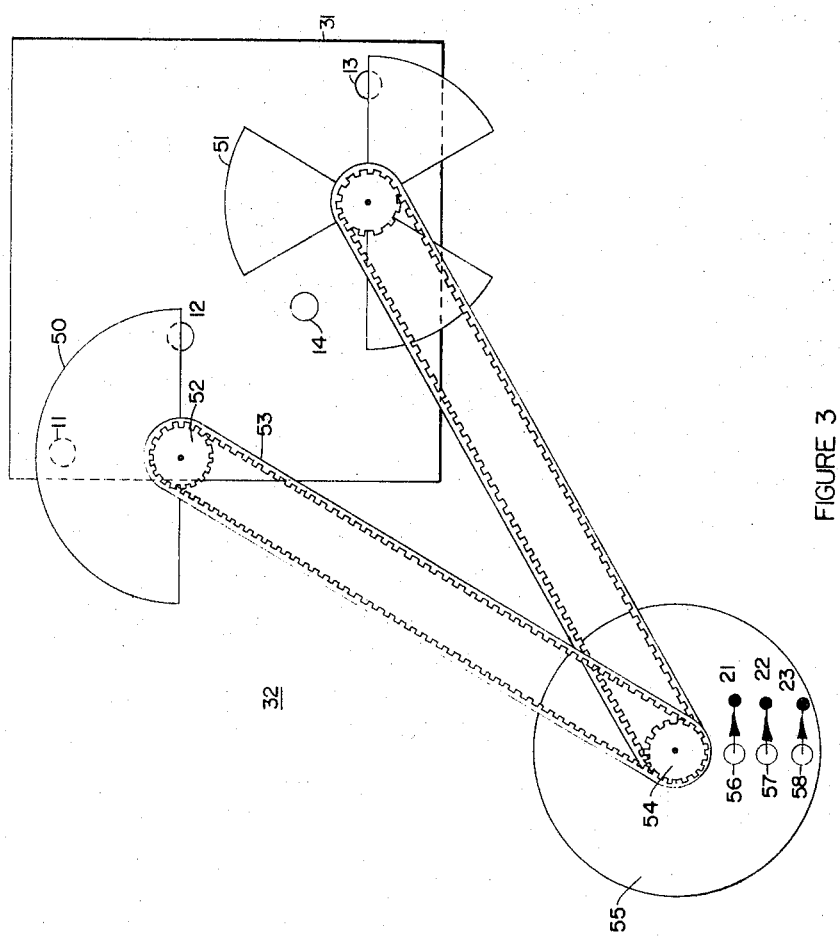
FIG. 3 is a front view of another embodiment of the shutter structure.

A structure more limited in size is shown in FIG. 3. An array of rotating vanes are used whereby each vane shutters two apertures. As in FIG. 2, these apertures are in a quadrature relationship. Any integral number of vanes can be used in each rotating member. For illustration FIG. 3 shows a single rotating vane 50 in addition to a three vane rotating member 51. They each respectively are shuttering apertures 11 and 12, and 13 and 14 on aperture plate 31 with each pair being in quadrature. The axis of the rotating vane 50 is driven by gear 52 which is driven by timing belt 53. This driven vane, along with the other driven vanes on the aperture plate, form the shutter structure 32. The various timing belts are driven by gear 54 which has a motor, not shown, on its axis. The gears, such as 50, and timing belts, such as 53, which are in the region of the aperture plate, can be made of materials such as aluminum and plastics which are relatively transparent to gamma rays and will not attenuate the gamma rays to any aperture. The aperture plate 31 and vanes 50 and 51 are made of materials relatively opaque to gamma rays such as lead or gold. One method of providing a shutter signal source 15 is shown using a timing wheel 55. This wheel contains the appropriate frequency information in concentric rings in either optical or magnetic patterns. These are detected by pick-up devices 56, 57, and 58, which can either be photocells or magnetic heads, to form shutter signals 21, 22, and 23. A variety of methods can be used to determine the frequency of each shutter including the number of vanes on each rotating member, the size of the gear 52 and the size of the gear 54. Since gears and timing belts are being used the relative frequencies and phases modulating each aperture will remain fixed with respect to timing wheel 55.

As was previously discussed, the selection of a specific aperture image to the exclusion of all others is a statistical process which depends on the total number of counts or photons received. For example, assume a relatively small source which creates an array of separate images at the detector, each modulated at a different shutter frequency. In the processing of FIG. 1 each individual stored image will contain the desired view from its own aperture, plus an array of ghost images from the other apertures whose amplitude will depend on the counting statistics. When the images are appropriately translated and added to observe the plane that contains the source, it would be desirable if these ghost images did not overlap and thus increase the backround noise. To insure that they don't overlap the apertures in aperture plate 31 must be in a random pattern such that when translated with respect to itself in any direction not more than one hole will coincide between the original and translated aperture plates. In mathematical terms, the two-dimensional antocorrelation of the aperture plate will have no value greater than $1/N$ of its maximum central value where $N$ is the number of apertures.

The basic system shown in FIG. 1 makes more efficient use of the emitted gamma rays because of the plurality of apertures and in addition provides three-dimensional depth information. The system can be designed to provide improved lateral resolution by making the holes relatively small compared to existing pinhole collimators. This can be accomplished in a system of this type without a loss of efficiency since a large number of holes can be used to increase the overall transmission.

In the system illustrated in FIG. 1 the individual stored images in 18, 19, and 20 as seen from the various apertures, are translated and added in 29 to provide the image of a single plane. If desired, more complex processing of the individual stored images can be accomplished. For example, out of focus images, in the final summation appear at different $x$, $y$ locations while in focus images, from the desired plane, appear at the same $x$, $y$ locations and thus add up. Thus, in a region containing an out of focus image from an undesired depth plane, the contribution from the various individual stored images can be considerably different. In the case of very simple images of a few small sources, an out of focus source in one individual image can have zero contribution in some of the individual translated images at particular locations. If it is desired to further minimize the contribution from these out of focus images, a computer can analyze the difference between the images at each translated $x, y$ location. If the images are significantly different in any region, that region can be rendered zero under the assumption that the information in that local area is due to a source from an undesired depth plane. If the images are comparable in amplitude, the assumption can be made that the image in that local area is due to a source at the desired depth plane and will thus be retained. This non-linear method further enhances the focused image as compared to the direct linear summation process shown in FIG. 1. It can cause errors, however, for relatively complex images where each area contains both focused and out of focus images. Many studies in nuclear medicine, such as the brain and thyroid, involve relative simple presentations and should profit from non-linear enhancement.

The depth of focus of the processed image at any particular depth location will depend on the separation of the various apertures compared to the distance to the source. In some studies it may be desirable to increase the depth of focus, that is to observe a relatively large depth region. This can be accomplished by first normalizing the size of each depth image as previously noted by scaling the output dimensions by $l-z/l$. With each processed depth plane normalized to its original dimensions, any number of these planes can be added to increase the effective depth of focus.

Display 30 has the image of a particular plane. The image information from each aperture can be displayed in other ways. The images stored in storage devices 18, 19, and 20 represent views of the source from different apertures or positions. These can be viewed two at a time in a stereoscopic viewer to provide a depth presentation from any desired angle. The images can be arranged in pairs to provide the equivalent of moving the head and viewing the source at different angles.

In addition, two general methods exist for combining the array of views into a single three-dimensional presentation which can be viewed from many angles. The first is called integral photography and was described by C. B. Burckhardt in the Journal of the Optical Society of America, Vol. 58, No. 71, 1968. A fly's-eye array of lenses is used to create and view the image. In creating the image, each projection is viewed at its appropriate position through an aperture. The film is successively exposed to each projection and then developed. The second general method is holography. Here again a sum of exposures are made with the appropriate images exposed at the same angles as that of the corresponding aperture. An interference pattern is made between each image and a reference beam. The resultant hologram is reconstructed in the conventional fashion to provide a three-dimensional image by the use of a coherent source of illumination.

What is claimed is:

1. Apparatus for imaging a source of gamma rays comprising:
   detector means for generating a position signal indicating the position of gamma rays emitted from the source;
   an aperture plate positioned between the source and the detector having a plurality of apertures;
   a plurality of shutters for modulating the plurality of apertures with a plurality of orthogonal functions;

means for deriving a plurality of shutter signals synchronous with the plurality of orthogonal functions;
   means for processing the position signal, using the plurality of shutter signals, to derive information about the intensity distribution of the source; and means for displaying the information about the intensity distribution of the source.

2. Apparatus as recited in claim 1 wherein the means for processing the position signal includes:
   a plurality of storage devices for storing the images as seen from each aperture;
   means for adding counts from the position signal to the corresponding position in each storage device when the shutter signal corresponding to that storage device indicates that the appropriate aperture is open; and
   means for subtracting counts from the position signal from the corresponding position in the storage device when the shutter signal corresponding to that storage device indicates that the appropriate aperture is closed.

3. Apparatus as recited in claim 2 including a summing storage device for storing information about a selected depth plane;
   means for translating the images of each of the plurality of storage devices an amount determined by the position of the corresponding aperture and the selected depth plane;
   means for adding all of the translated images in the summing storage device whereby the image of the selected depth plane is formed.

4. Apparatus as recited in claim 2 wherein the means for displaying the information includes a stereoscopic viewer for viewing pairs of stored images as seen from two different apertures.

5. Apparatus as recited in claim 2 wherein the means for displaying the information is an integral photography system including an array of spherical lenses adjacent to a photographic film with each of the stored images photographed in their correct relative position whereby the developed integral photograph provides a three-dimensional image of the source.

6. Apparatus as recited in claim 2 wherein the means for displaying the information is a holographic system including a transparency on which each stored image has been recorded in its correct relative position as an interference pattern with a coherent reference beam whereby the transparency, when illuminated with coherent light, provides a three-dimensional image of the source.

7. Apparatus as recitd in claim 1 wherein the means for processing the position signal comprises:
   a summing storage device for storing information about a selected depth plane;
   means for generating a plurality of translated signals by translating the coordinates of the position signal an amount corresponding to the position of each of the plurality of apertures and the selected depth plane;

means for adding counts from each of the plurality of translated signals to the corresponding position in the summing storage device when the shutter signal corresponding to that aperture is open; and means for subtracting counts from each of the plurality of translated signals in the summing storage device when the shutter signal corresponding to that aperture is closed.

8. Apparatus as recited in claim 7 including means for storing the position signal whereby any selected depth plane may subsequently be derived.

9. Apparatus as recited in claim 1 wherein the plurality of orthogonal functions includes waveforms of different frequencies.

10. Apparatus as recited in claim 9 wherein the plurality of orthogonal functions includes waveforms of the same frequency in quadrature phase relationship.

11. Apparatus as recited in claim 9 wherein the total time for collecting gamma rays contains an integral number of cycles of every waveform of different frequency.

12. Apparatus as recited in claim 9 wherein every waveform is symmetrical, having an open shutter interval with the same duration as the closed interval.

13. Apparatus as recited in claim 1 wherein the plurality of shutters for modulating the plurality of apertures comprises:

a shutter plate having a plurality of slots; and
means for moving the shutter plate with respect to the aperture plate so that the slots periodically coincide with the apertures.

14. Apparatus as recited in claim 13 wherein the shutter plate is a rotatable disc and the plurality of slots are positioned uniformly on concentric circles of the disc, with the slots of each circle having a different angular frequency.

15. Apparatus as recited in claim 14 wherein the aperture plate contains two apertures on each concentric circle corresponding to quadrature phases of the frequency generated by the slots.

16. Apparatus as recited in claim 1 wherein the plurality of shutters for modulating the plurality of apertures includes a plurality of rotatable members each containing an integral number of vanes mounted adjacent to the aperture plate whereby the rotating vanes periodically interrupt the transmission of gamma rays through the apertures.

17. Apparatus as recited in claim 16 wherein two apertures, corresponding to quadrature phases of the frequency generated by the rotating vanes, are used with each rotating member.

18. Apparatus as recited in claim 1 wherein the plurality of apertures in the aperture plate are arranged so that when an image of the aperture plate is translated with respect to the aperture plate in any direction, not more than one aperture will coincide at any translated position.

* * * * *